United States Patent [19]
Miller

[11] Patent Number: 5,608,722
[45] Date of Patent: Mar. 4, 1997

[54] MULTI-USER COMMUNICATION SYSTEM ARCHITECTURE WITH DISTRIBUTED RECEIVERS

[75] Inventor: David S. Miller, Escondido, Calif.

[73] Assignee: Qualcomm Incorporated, San Diego, Calif.

[21] Appl. No.: 415,958

[22] Filed: Apr. 3, 1995

[51] Int. Cl.$^6$ ........................................... H04J 13/04
[52] U.S. Cl. ........................... 370/320; 370/203; 375/206
[58] Field of Search ................................. 370/18, 19, 20, 370/22, 100.1, 95.1; 375/267, 259, 200, 206, 210, 373, 371, 205

[56] References Cited

U.S. PATENT DOCUMENTS

| | | | |
|---|---|---|---|
| 4,866,395 | 9/1989 | Hosetter | 329/319 |
| 4,888,788 | 12/1989 | Teranishi et al. | |
| 4,901,307 | 2/1990 | Gilhousen et al. | 370/18 |
| 5,101,501 | 3/1992 | Gilhousen et al. | 455/33 |
| 5,103,459 | 4/1992 | Gilhousen et al. | |
| 5,109,390 | 4/1992 | Gilhousen et al. | |
| 5,166,951 | 11/1992 | Schilling | |
| 5,228,054 | 7/1993 | Rueth et al. | |
| 5,228,056 | 7/1993 | Schilling | |
| 5,267,261 | 11/1993 | Blakeney et al. | |
| 5,309,474 | 5/1994 | Gilhousen et al. | |
| 5,311,176 | 5/1994 | Gurney | 341/50 |
| 5,442,627 | 8/1995 | Viterbi et al. | 375/205 |
| 5,442,661 | 8/1995 | Falconer | 375/205 |
| 5,450,453 | 9/1995 | Frank | 370/18 |

OTHER PUBLICATIONS

*Digital Communications with Space Applications*, S. W. Golomb et al., Prentice Hall, Inc. 1964, pp. 45–64.

Primary Examiner—Douglas W. Olms
Assistant Examiner—Chau T. Nguyen
Attorney, Agent, or Firm—Russell B. Miller; Gregory D. Ogrod

[57] ABSTRACT

Method and apparatus for receiving signals in gateways for satellite repeater type spread spectrum communication systems making more efficient use of data transfer capacity and diversity processing. Several communication signals are received by multiple analog receivers and converted into digital format. The digital communication signals are transferred from each analog receiver into a series of demodulation or FHT modules in which they are first despread into encoded data symbols using predetermined PN coding sequences, and then mapped into symbol energy metrics using orthogonal transformers, such as fast Hadamard transformers. The transformation output for each communication channel from each analog receiver is input to a single metric receiver for a data channel or subscriber, where it is subjected to conventional metric signal processing to reconstruct the data. A set of dedicated modules is coupled to each analog receiver for handling each diversity path or subscriber active communication system channel being transferred through that receiver or analog path. Each demodulation or FHT module comprises despreading elements and FHT components that are easily distributed in processing arrays within the gateway.

20 Claims, 8 Drawing Sheets

MULTI-USER COMMUNICATION SYSTEM ARCHITECTURE WITH DISTRIBUTED RECEIVERS

BACKGROUND OF THE INVENTION

I. Field of the Invention

The present invention relates to multiple access communication systems, such as wireless data or telephone systems, and satellite repeater type spread spectrum communication systems. More particularly, the invention relates to a communication system architecture in which digital signal demodulation is performed using multiple digital receiver modules coupled to each of several analog receivers to decrease data transfer requirements. The invention further relates to a method of redistributing certain signal demodulation functions in a code division multiple access spread spectrum type communication system to decrease the rate of data transfer required to produce single user data signals.

II. Description of the Related Art

A variety of multiple access communication systems has been developed for transferring information among a large number of system users. The techniques employed by such multiple access communication systems include time division multiple access (TDMA), frequency division multiple access (FDMA), and AM modulation schemes, such as amplitude companded single sideband (ACSSB), the basics of which are well known in the art. However, spread spectrum modulation techniques, such as code division multiple access (CDMA) spread spectrum techniques, provide significant advantages over the other modulation schemes, especially when providing service for a large number of communication system users. The use of CDMA techniques in a multiple access communication system is disclosed in the teachings of U.S. Pat. No. 4,901,307, which issued Feb. 13, 1990 under the title "SPREAD SPECTRUM MULTIPLE ACCESS COMMUNICATION SYSTEM USING SATELLITE OR TERRESTRIAL REPEATERS", is assigned to the assignee of the present invention, and is incorporated herein by reference.

The 4,901,307 patent discloses a multiple access communication system technique in which a large number of generally mobile or remote system users each employs a transceiver to communicate with other system users or desired signal recipients, such as through a public telephone switching network. The transceivers communicate through satellite repeaters and gateways or terrestrial base stations (also sometimes referred to as cell-sites or cells) using code division multiple access (CDMA) spread spectrum type communication signals. Such systems allow the transfer of various types of data and voice communication signals between system users, and others connected to the communication system.

Communication systems using spread spectrum type signals and modulation techniques such as disclosed in U.S. Pat. No. 4,901,307, provide increased system user capacity over other techniques because of the manner in which the frequency spectrum is 'reused' many times across different regions serviced by the system and concurrently among system users within a region. The use of CDMA results in a higher efficiency in utilizing a given frequency spectrum than achieved using other multiple access techniques. In addition, the use of wide band CDMA techniques permits such problems as multipath fading to be more readily overcome, especially for terrestrial repeaters.

Pseudonoise (PN) modulation techniques used in wide band CDMA communications provide a relatively high signal gain which allows spectrally similar communication channels or signals to be more quickly differentiated. This allows signals traversing different propagation paths to be readily distinguished, provided any path length difference causes relative propagation delays in excess of the PN chip duration, that is, the inverse of the bandwidth. If a PN chip rate of say approximately 1 MHz is used, the full spread spectrum processing gain, equal to the ratio of the spread bandwidth to system data rate, can be employed to discriminate between signal paths differing by more than one microsecond in path delay or time of arrival.

The ability to discriminate between multipath signals greatly reduces the severity of multipath fading, although it does not typically eliminate it due to occasional path delay differentials of less than a PN chip duration. The existence of low delay paths is more especially true for satellite repeaters or directed communication links because multipath reflections from buildings and other terrestrial surfaces are greatly reduced, and the overall path is so large. Therefore, it is desirable to provide some form of signal diversity as one approach to reduce the deleterious effects of fading and additional problems associated with relative user, or satellite repeater, movement.

Generally, three types of diversity are produced or used in spread spectrum type communication systems, and they are time, frequency, and space diversity. Time diversity is obtainable using repetition and time interleaving of signal components. A form of frequency diversity is inherently provided by spreading the signal energy over a wide bandwidth. Therefore, frequency selective fading affects only a small part of the CDMA signal bandwidth. Space diversity is provided using multiple signal paths, typically through different antennas or beams.

The beams used in satellite repeater communication systems are typically configured to cover larger geographic regions and, therefore, potentially address a larger number of users at any given time than terrestrial repeater systems. Each satellite generally employs multiple beams, on the order of eleven to sixteen, to reach several contiguous geographical regions at one time, and provide diversity. The relative size of the targeted subscriber audience in each beam is generally large even where the areal density of subscribers is small. That is, even though service areas might encompass land regions with low population densities, the overall size of each region means there is still a significantly large number of subscribers within a given satellite beam pattern. In addition, satellites are used in some geographical regions to overcome a lack of land based telephone systems, and such regions may have relatively high population densities.

Providing service to larger numbers of subscribers using satellites translates to both more effective transmitters or antennas per repeater, up to 16 beams per satellite, and more communication channels per satellite beam. Typically, the number of communication channels or circuits per beam in a satellite is increased to 128 channels from the 64 typically found in terrestrial repeaters. These factors greatly increase the amount of data and signal processing that must be accommodated within a system gateway as opposed to base stations.

Terrestrial base stations generally use no more than six antennas, ranging anywhere from one for an entire cell to two per each of three sectors in a subdivided cell, each receiving communication signals on one carrier frequency.

Satellite gateways, on the other hand, handle communication signals using an array of receivers, on the order of 32 or more, with one or possibly more, as desired, antennas to accommodate sixteen or more beams or spots on different carrier frequencies. Gateways also provide service to multiple satellites which are 'in view', typically on the order of four at any given time. In one exemplary system, on the order of six satellites are used in each of eight orbital planes and even more satellites are contemplated for some systems.

The larger number of communication signals being accommodated in satellite type repeater systems translates into large amounts of data to be transferred through and processed within each gateway. When signals received by each antenna are downconverted to an appropriate baseband frequency and the carrier removed to provide digital samples, the data rates are on the order of 80 megabits-per-second (Mbps) per carrier frequency (beam). The signals from each analog receiver are transferred to an array of modems within the gateway which are assigned to process communications for particular subscribers. This means that data from each receiver must be transferred along common busses connected to all modems in order that they can each detect and process multi-path signals. For the current data rates within communication systems, the gateway busses transferring signals between analog receivers and modem sections of a gateway would have to handle on the order of several gigabits-per-second (Gbps) or more. The control, switching, timing, etc., for this much data is beyond the limits of cost effective gateway systems. This strains bus transfer structures beyond the limits of current technology within reasonable cost and reliability constraints. In addition, cabling requirements for transferring this volume of data among various processing circuit structures also becomes prohibitively complex.

Therefore, it is desirable to reduce the quantity of data that must be transferred from one functional element or stage to another within the architecture of a gateway. It is also desirable to make more efficient use of lower cost modular components that provide for ready expansion of systems, as capacity is increased or updating is needed.

SUMMARY

In view of the above and other problems found in the art relative to processing communication signals in gateways and base stations in spread spectrum communication systems, one purpose of the present invention is to distribute communication processing requirements for demodulating orthogonal channels in received signals in a gateway.

A second purpose of the invention is to decrease the total volume of data per unit time that must be transferred along common signal conductors between analog and digital data signal processing elements in a gateway portion of a spread spectrum type communication system.

Another purpose is to provide a technique that allows for a more cost effective allocation of processing resources in association with each analog receiver in a gateway.

One advantage of the invention is that it uses spread spectrum and other digital signal processing modules that are very reliable, easy to manufacture, and cost effective to distribute into parallel arrays for use with gateway analog receivers.

Other advantages include a reduction in data transfer rates on circuit backplanes, and in the number of cables and conductors required, along with reductions in associated processing equipment volume.

These and other purposes, objects, and advantages are realized in a signal processing architecture for use within a gateway type base station in a spread spectrum multiple access communication system, such as code division multiple access (CDMA) type wireless telephone/data communication systems. In these systems, users or system subscribers communicate through base stations or satellite repeaters and gateways, using different encoded communication signal channels within given carrier frequencies. A number of spread spectrum communication signals are received over one or more diversity transfer paths from multiple system subscribers using analog receivers, each of which is configured to receive signals on at least one carrier frequency. The analog receivers convert communication signals to digital communication signals at predetermined sampling rates. The digital communication signals are output to a corresponding set or series of demodulating modules connected to the outputs of each analog receiver. The number of modules coupled to each analog receiver is such that at least one module should be available for each diversity communication path over which it is desired to receive information from each subscriber through that corresponding analog receiver.

The demodulating modules despread each of the digital communication signals using preselected in-phase (I) and quadrature (Q) phase pseudorandom noise (PN) type code sequences for the particular communication system, with off-sets or time shifts as appropriate, to produce encoded data symbols. These preselected pseudonoise (PN) sequences are also used to modulate in-phase and quadrature components of digital data signals prior to transmission to intended recipients.

The modules also generally accumulate the encoded data symbols into predefined groups of symbols and apply at least a preselected number of them to an orthogonal function transformer where they are mapped or converted into symbol energy metrics for symbol data. The energy metrics are indicative of energy values associated with hypothesis for encoded data for a channel operating through a corresponding analog receiver.

The demodulating modules each comprise a despreading stage or circuit in one portion of the module for generating the encoded data symbols for each diversity path for each subscriber, and an orthogonal code transformer or transformation circuit in another portion for receiving and performing orthogonal transformations or mappings on the encoded data symbols to generate symbol energy metrics. Exemplary transformers are Fast Hadamard Transformers having an order corresponding to the group size of the input symbols. Therefore, the output of each transformer represents metrics for one channel operating through one corresponding receiver.

The demodulating modules can be manufactured as demodulator front ends (DFE) and demodulator back ends (DBE) with a common transfer bus connected in-between. This allows a large degree of modular construction and circuit integration for purposes of cost reduction and reliability. Typically, there are as many transformer stages, DBEs, as there are despreading stages, DFEs, although some degree of time sharing or signal selection could allow an unequal number of stages as desired.

The metric data generated in each of the demodulating modules, or DBEs, is transferred to at least one of a series of metric data receivers, each of which is pre-assigned to a subscriber. Each of the metric receivers correspond to a single encoded signal channel to be processed, and each transformation circuit output corresponds to one channel metric receiver.

Each of the plurality of metric data receivers is connected to receive energy metric signals from one or more of the demodulation modules associated with each analog receiver. The invention may further comprise the use of a summation element at inputs of each of the metric receivers for summing symbol energy metrics received from multiple modules or transformers to generate a single channel symbol energy metric for deriving channel data.

In further aspects of the invention, a relative time difference between received communication signals and a phase of the PN sequences is tracked, and a timing adjustment signal is provided to indicate sign and magnitudes of any difference. The digital signals are also decimated after despreading with the point of decimation also being adjusted in response to changes in value for a timing control signal.

The present invention is very useful for reducing the complexity of signal transfer structures in gateway type base stations which are communicating with at least one satellite based repeater to transfer the communication channel signals from subscriber units within the communication system to analog receivers. This is especially useful where there are at least two satellites in communication with the gateway at any given time.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF THE PREFERRED EMBODIMENTS

The present invention provides a new signal processing architecture for base stations and gateways used in spread spectrum multiple access communication systems. A new digital receiver and demodulation scheme is employed that makes more efficient use of available signal bus capacity. The method and apparatus of the present invention converts communication signals received by each of a series of receivers to digital form and then demodulates each of the signals to remove outer PN codes and compute signal data energy metrics for the data being transferred to all system users on each of several frequencies. The data metrics for each intended user within each received signal are then transferred to signal decoders and diversity combiners assigned to individual communication circuits or recipients.

Initial layers of this system architecture involve analog signal processing and despreading of digital communication signals, and can be accomplished cost effectively using a series of circuit modules designated as 'FHT modules'. Data is output from the FHT modules at a reduced bit rate which can be more easily accommodated or manipulated using current technology. Energy metric data provided at this level is more readily transferred to a series of user decoders at lower data rates than traditional A/D data samples for a large number of received signals. This is very useful for satellite based repeater systems.

In current designs for CDMA communication systems, such as wireless data or telephone systems, base stations within predefined geographical regions, or cells, each use several modulator-demodulator units or spread spectrum modems to process communication signals for system users. Each spread spectrum modem generally employs a digital spread spectrum transmission modulator, at least one digital spread spectrum demodulator, and at least one searcher receiver. During typical operations, a modem in a base station is assigned to each remote or mobile user unit as needed to accommodate transfer of communication signals with the assigned user unit. For communication systems employing satellite repeaters, these modems are generally placed in base stations referred to as gateways or hubs that communicate with users by transferring signals through the satellites using specialized antennas and control systems. There may be other associated control centers that communicate with the satellites or the gateways to maintain system wide traffic control and signal synchronization.

Figure 1:
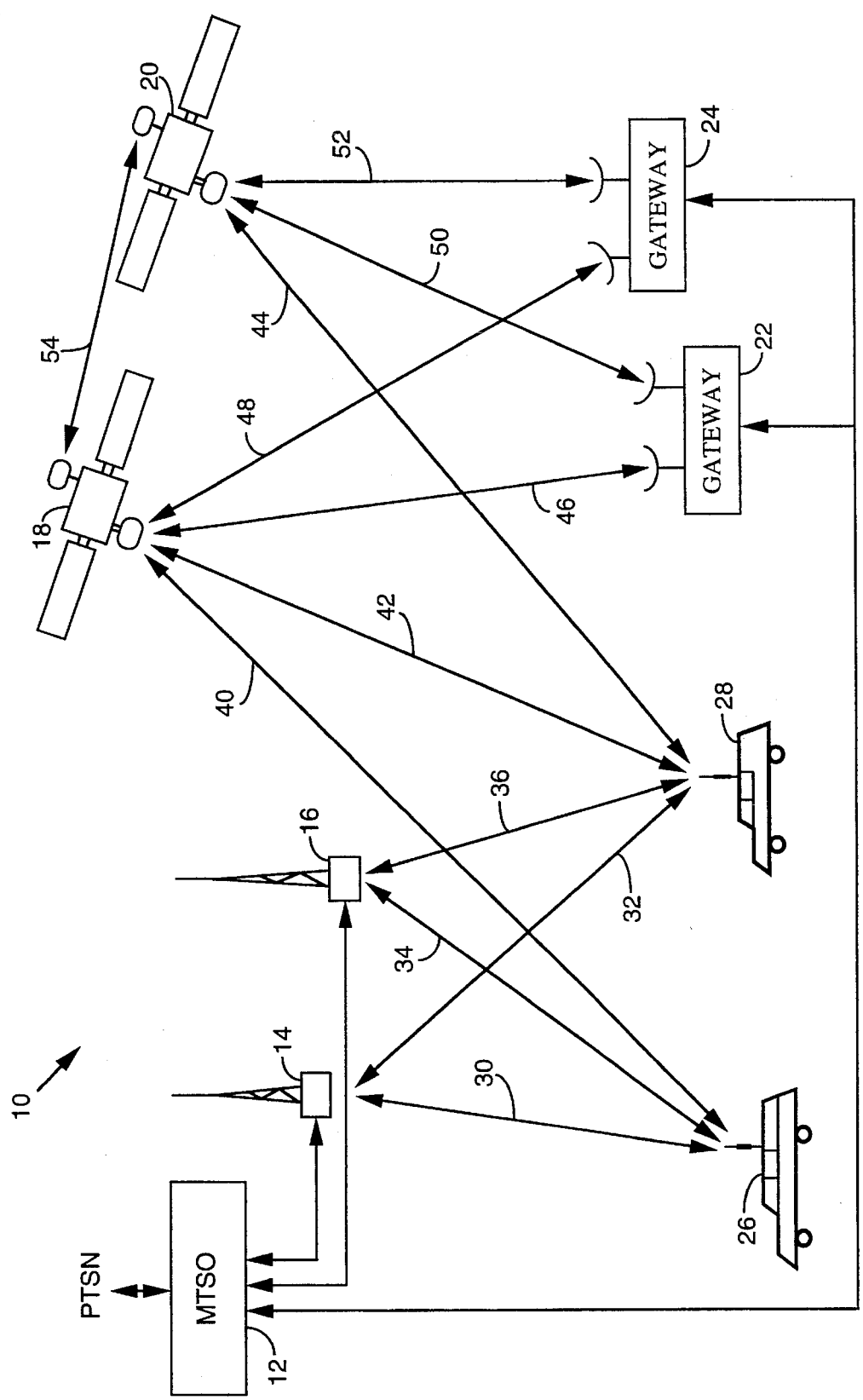
FIG. 1 illustrates a schematic overview of an exemplary wireless communication system.

An exemplary wireless communication system constructed and operating according to the principles of the present invention, is illustrated in the overall view of FIG. 1. A communication system 10 illustrated in FIG. 1 utilizes spread spectrum modulation techniques in communicating between remote or mobile subscriber units having wireless data terminals or telephones, and system base stations. Cellular telephone type systems in large metropolitan areas may have hundreds of such terrestrial base stations serving thousands of mobile users. Communication systems using satellite repeaters, typically use fewer repeaters to service more users per repeater but dispersed over larger geographical regions.

As seen in FIG. 1, communication system 10 uses a system controller and switch 12, also referred to as mobile telephone switching office (MTSO), which typically includes interface and processing circuitry for providing system-wide control for base stations or gateways. Controller 12 also controls the routing of telephone calls from a public switched telephone network (PSTN) to an appropriate base station or gateway for transmission to desired or designated subscriber units, as well as the routing of calls received from subscriber units through one or more base stations to the PSTN. Controller 12 generally places subscriber units in communication with each other by connecting calls between users through appropriate base stations and PSTN's, since the subscriber units in most communication systems are typically not configured to communicate directly with one another. The communication link coupling controller 12 to various system base stations can be established using known devices such as, but not limited to, dedicated telephone lines, optical fiber links, or microwave or dedicated satellite communication links.

In the portion of the communication system illustrated in FIG. 1, two exemplary base stations 14 and 16 are shown for terrestrial repeater communications, along with two satellite repeaters 18 and 20, and two associated gateways or hubs 22 and 24. These elements are used to effect communications with two, or more, remote subscriber units 26 and 28, which each have a wireless communication device such as, but not limited to, a cellular telephone. While these subscriber units are discussed as being mobile, it is also understood that the teachings of the invention are applicable to fixed units where remote wireless service is desired. This latter type of service is particularly relevant to using satellite repeaters to establish communication links in many remote areas of the world.

The subscriber units are also sometimes referred to as user terminals or simply 'users' in some communication systems, depending on preference. In addition, a typical communication system would employ a larger number of satellites than the two illustrated in FIG. 1, on the order of 48 or more, traveling in several different orbital planes in Low Earth Orbit (LEO), and a larger number of subscriber units. However, those skilled in the art will readily understand how the teachings of the present invention can be applied to a variety of satellite system configurations and gateways.

The terms beams (spots) and cells, or sectors, are used interchangeably throughout since they may be referred to in this manner in the art and the geographic regions serviced are similar in nature differing only in the physical characteristics of the type of repeater platform used and its location. Although, certain characteristics of the transmission paths and restraints on frequency and channel reuse differ between these platforms. A cell is defined by the effective 'reach' of base station signals, while a beam is a 'spot' covered by projecting satellite communication signals onto the Earth's surface. In addition, sectors generally cover different geographical regions within a cell, while satellite beams at different frequencies, sometimes referred to as FDMA signals, may cover a common geographical region.

The terms base station and gateway are also sometimes used interchangeably, with gateways being perceived in the art as specialized base stations that direct communications through satellite repeaters and have more 'housekeeping tasks,' with associated equipment, to perform to maintain such communication links through moving repeaters, while base stations use terrestrial antennas to direct communications within a surrounding geographical region. Central control centers will also typically have more functions to perform when interacting with gateways and moving satellites.

It is contemplated for this example that base stations 14 and 16 each provide service over individual geographic regions or 'cells' serviced by transmission patterns from their respective antennas, while beams from satellites 18 and 20 are directed to cover other respective geographic regions. However, it is readily understood that the beam coverage or service areas for satellites and the antenna patterns for terrestrial repeaters may overlap completely or partially in a given region depending on the communication system design and the type of service being offered. Accordingly, at various points in the communication process handoffs may be made between base stations or gateways servicing the various regions or cells, and diversity may also be achieved between any of these communication regions or devices.

The signal gain made possible by CDMA modulation techniques allows a 'soft' handoff scheme when a subscriber unit changes location sufficiently to traverse into a region serviced by a new base station, gateway, or satellite beam pattern. A communication link may be maintained by two modems at once, one for each of two gateways, or transferred between modems in accordance with received signal strength and frequency availability. In this manner, a subscriber unit utilizes multiple gateway modems in the handoff process which also increases the amount of data that must be transferred for processing within the gateway.

In FIG. 1, some of the possible signal paths for communication links or 'circuits' between base station 14 and subscriber units 26 and 28 are illustrated by a series of lines 30 and 32, respectively. The arrowheads on these lines illustrate exemplary signal directions for the links, as being either a forward or reverse link, but only for purposes of clarity and not to represent any restrictions on actual signal patterns or required communication paths. In a similar manner, possible communication links between base station 16 and user units 26 and 28, are illustrated by lines 34 and 36, respectively.

Additional possible signal paths are illustrated for communications established through satellites 18 and 20 between one or more gateways or centralized hubs 22 and 24, and subscriber units 26 and 28. The satellite-user portions of these communication links are illustrated by a series of lines 40, 42, and 44, and the gateway-satellite portions by lines 46, 48, 50, and 52. In some configurations, it may also be possible to establish direct satellite-satellite communications such as over a link indicated by line 54. For purposes of clarity, satellite 20 is not shown communicating with subscriber unit 26, although this is certainly possible depending on the specific system configuration and satellite beam pattern distribution.

In current CDMA wireless or cellular telephone systems, each base station or gateway also transmits a 'pilot carrier' signal, containing no data modulation, throughout its region of coverage. Generally, sectors each have their own distinct pilot signals. This pilot signal is used by subscriber units to obtain initial system synchronization, and time, frequency and phase tracking of transmitted signals. For satellite systems, this signal is transferred within each satellite beam and originates with specific gateways using the satellite. A single pilot is typically transmitted by each gateway or base station for each frequency used and shared by all users receiving signals from that source. Other signals are used to transmit spread spectrum modulated information, such as gateway identification, system timing, user paging information, and various other control signals.

Each gateway typically uses a unique pilot signal (subject to system wide re-use) generated using the same PN code at different code phase offsets. This allows PN codes that can be readily distinguished from each other, also distinguishing between originating base stations and gateways, while providing simplified acquisition and tracking. Using one pilot signal code sequence throughout a communication system allows subscriber units to find system timing synchronization with a single search over all pilot signal code phases using a correlation process for each code phase.

In the alternative, a series of PN codes are used within the communication system with different PN codes being used for each gateway, and possibly for each satellite plane. It will be readily apparent to those skilled in the art that as many or as few PN codes as desired can be assigned to identify specific signal sources or repeaters within the communication system. That is, codes can be employed to differentiate each repeater or signal originator within the system as desired, subject to the total number of possible communication channels and a desire to maximize the number of users addressable within the system.

Another signal, referred to as the paging signal or channel, may also be used by the communication system to transmit messages to subscriber units indicating that a call or some form of communication information has 'arrived' or is present at the gateway and is being 'held' for them. The paging signal typically provides appropriate channel assignments for use when a user initiates a communication link, and requests a response from the designated subscriber unit.

The geographic areas serviced by base stations are designed in substantially non-overlapping or non-intersecting shapes that normally place a user or subscriber unit closer to one base station than another, or within one cell sector where the cell is further sub-divided. This is also substantially the same for satellite communications, although the determinative factor here is presence within a particular beam pattern from a satellite in view of a subscriber unit, and its signal strength, but not relative closeness to a satellite. In addition, beams may overlap within a given region but be differentiated using certain transmission characteristics such as frequency. In FIG. 1, user unit 28 may be considered as being closest to base station 16 for terrestrial service purposes but within the coverage of satellites 18 or 20 for gateway service purposes.

When initiating calls, subscriber unit 28 transmits control messages to the nearest base station or appropriate satellite gateway, here 16 or 12. Upon receiving the call request message, base station 16 transfers the called number to system controller 12 which then connects the call through a PSTN to an intended recipient. In the alternative, a communication link is established with gateway 22 through satellite 18, which receives and transfers the call request message to system controller 12 for processing as before.

When a call or message link request for a subscriber unit originates within the PSTN or with another subscriber unit, controller 12 generally transmits call information to all base stations or gateways in a predefined area where the targeted unit is either known to be, such as based on previous message information, or predicted to be, such as in a 'home' region. Gateways and base stations in turn transmit paging messages within their respective coverage areas for the intended recipient user. Upon detecting a page message, the subscriber unit responds with the control message to the nearest base station or through the appropriate satellite to a gateway. This control message informs system controller 12 which particular gateway, satellite, or base station is in communication with the subscriber unit. Controller 12 then routes the incoming message or call through that gateway link to the subscriber unit. Should the subscriber unit, here 28, move out of the coverage area of the initially chosen satellite, 18, or gateway, 22 or 24, an attempt is made to continue the communication link by routing communication signals through other satellites until either a different gateway or a base station must be used. Again, maintaining extra communication links and searching channels for this type of communication presents additional signals for gateways to process.

Space or path diversity is obtained by providing multiple signal paths through simultaneous links with a mobile user through two or more base stations, for terrestrial-based repeater systems, or two or more satellite beams or individual satellites, for space-based repeater systems. That is, in the satellite communication environment or for indoor wireless communication systems, path diversity may be obtained by deliberately transmitting or receiving communications for a single subscriber using multiple communication paths or antennas. Furthermore, path diversity may be obtained by exploiting a multipath environment by allowing a signal arriving over different paths, each with a different propagation delay, to be received and processed separately for each path. If two or more paths are available with sufficient delay differential, say greater than one microsecond, two or more receivers may be employed to separately receive these signals. Since these signals typically exhibit independent fading and other propagation characteristics, the signals can be separately processed by the receivers and the outputs combined with a diversity combiner to provide the final output information or data, and overcome problems otherwise existent in a single path.

Examples of using path diversity in multiple access communication systems are illustrated in U.S. Pat. No. 5,101,501 entitled "SOFT HANDOFF IN A CDMA CELLULAR TELEPHONE SYSTEM," issued Mar. 31, 1992, and U.S. Pat. No. 5,109,390 entitled "DIVERSITY RECEIVER IN A CDMA CELLULAR TELEPHONE SYSTEM," issued Apr. 28, 1992, both assigned to the assignee of the present invention and incorporated herein by reference.

While terrestrial based repeaters and base stations have been predominantly employed, future systems will place more heavy emphasis on the use of satellite based repeaters for broader geographic coverage which reaches larger numbers of 'remote' users and to achieve truly 'global' communication service. Unfortunately, the expansion of communication systems into the global network type of structure and advanced use of satellite repeaters creates additional problems for central stations and gateways processing the large number of communication links.

Spread spectrum type communication systems, such as in FIG. 1, use a waveform based on a direct sequence pseudonoise (PN) spread spectrum carrier. That is, a baseband signal is modulated using a pseudonoise sequence to achieve the desired spreading effect. The PN sequence consists of a series of 'chips' which have a frequency much higher than the baseband communication signal being spread. A typical chip rate is on the order of 1.2288 MHz and is chosen according to total bandwidth desired or allowable signal interference, and other criteria relating to signal strength and quality which are known to those skilled in the art. Those skilled in the art appreciate how the chip rate is modified according to allocated spectrum, in view of cost constraints and communication quality trade-offs.

In the base station- or gateway-to-subscriber link, the binary sequences used for spreading the spectrum are constructed from two different types of sequences, each having different properties and serving a different function. An 'outer' code is used to discriminate between signals transmitted by different base stations and between multipath signals. This outer code is shared by all signals in a cell, or beam and is generally a relatively short PN code sequence. An 'inner' code is then used to discriminate between the different users within a region or between user signals transmitted by a single base station, gateway, or satellite beam, on the forward link. That is, each subscriber unit has its own orthogonal channel provided on the forward link by using a unique covering PN code sequence. On the reverse link, the user signals are not completely orthogonal but are differentiated by the manner in which they are code symbol modulated.

It is well known in the art that a set of n orthogonal binary sequences of length n, for n being a power of 2, can be constructed. This is discussed in the literature such as in Digital Communications with Space Applications, S. W. Golomb et al., Prentice-Hall, INC., 1964, pp. 45–64. In fact, sets of orthogonal binary sequences are also known for most sequences having lengths which are multiples of four but less than two hundred. One class of such sequences that is relatively easy to generate is called the Walsh function, also known as Hadamard matrices.

A Walsh function of order n can be defined recursively as:

$$W(n) = \begin{vmatrix} W(n/2) & W(n/2) \\ W(n/2) & W^*(n/2) \end{vmatrix}$$

where W* denotes the logical complement of W, and W(1)=0. A Walsh sequence, then, is simply one of the rows of a Walsh function matrix, and a Walsh function of order 'n' contains n sequences, each being n bits in length.

A Walsh function of order n (as well as other orthogonal functions) has the property that over an interval of n code symbols in a string of symbols, the cross-correlation between all of the different sequences within the set is zero, provided the sequences are temporally aligned. This is easily understood by observing that exactly half of the bits in every sequence differ from those in every other sequence. Another useful property is that one sequence always consists of all zeroes while all of the other sequences consist of half ones and half zeroes. Therefore, Walsh functions are well suited for use as orthogonal codes or code sequences in communication systems.

It is also understood in the art that Walsh functions can be expressed in terms of 1's and −1's, real form, as where the digital values are converted to useful voltage transitions for signal processing. In this approach, the all zeroes function becomes an all ones function, or negative ones, and all of the other sequences consist of half ones and half negative ones.

Several carrier waveforms can be used within communication system 10, with a typical embodiment employing a sinusoidal carrier that is quadraphase (four phase) modulated by a pair of binary PN sequences. In this approach, the sequences are generated by two different PN generators of the same sequence length. One sequence bi-phase modulates an in-phase channel (I Channel) of the carrier and the other sequence bi-phase modulates a quadrature phase or just quadrature channel (Q Channel) of the carrier. The resulting signals are summed to form a composite four-phase carrier.

In a typical configuration, all signals transmitted by a gateway or base station share the same outer PN codes for both I and Q channels, with one code being shifted 90 degrees from the other. The signals are also spread with the inner code generated by using Walsh functions, as noted above. The Walsh function size 'n' used is typically on the order of 64 or 128 for the gateway-to-subscriber link creating up to one hundred and twenty-eight different orthogonal communication signals or forward link channels, for each carrier frequency. Up to three of these sequences may be dedicated to pilot, sync and paging channel functions, for one single frequency within a beam. A signal addressed to a particular user is multiplied by the outer PN sequences and by the particular Walsh sequence, or sequence of Walsh chips, assigned by the gateway or a communication system controller for the duration of that user's forward link or information transfer.

Neighboring cells, sectors, or other predefined geographical coverage regions can reuse inner Walsh functions because the outer PN codes used in such regions are distinct from each other. Differing propagation times for signals arriving at a particular subscriber's location from two or more satellite beams (gateways), mean that it is not possible to preserve an absolute time alignment for signals, as required for maintaining Walsh function orthogonality for multiple cells at one time. Reliance is placed on outer PN codes to discriminate between signals received from different gateways. However, all signals transmitted by a gateway over a single satellite beam are orthogonal to each other and do not substantially contribute interference to each other. This eliminates a majority of the interference in most locations, allowing a higher capacity to be obtained.

In the sync, paging, and voice or traffic channel signals, input data, such as digitized speech, is typically encoded, provided with repetition, and then interleaved to provide error detection and correction functions. This allows the communication system to operate with lower signal-to-noise and interference ratios. The repetition process assures that the data is transferred at a preselected rate. For example, 4800 bps data could be repeated once, and 2400 bps data four times within a data frame to acquire a desired 9600 bps rate. Techniques for encoding, repetition and interleaving are well known in the art. The symbols in the error correction encoded symbol stream for each channel are then multiplied by an assigned Walsh code sequence, as discussed above, and then multiplied by the outer PN codes. The resulting spread symbol streams for each signal are then added together to form a composite waveform.

The resulting composite waveform is then modulated onto a sinusoidal carrier, bandpass filtered, translated to the desired operating frequency, amplified and radiated by an antenna system. Alternate embodiments may interchange the order of some of these operations for forming a gateway transmitted signal. For example, it may be preferred to multiply each voice channel signal by the outer PN coded waveform and perform a filtering operation prior to summation of all the channel signals to be transmitted. Summation may be accomplished at several different points in the processing such as at the IF frequency, or at the baseband frequency either before or after multiplication by the PN sequence. It is well known in the art that the order of linear operations may be interchanged to obtain various implementation advantages and different designs.

Figure 2:
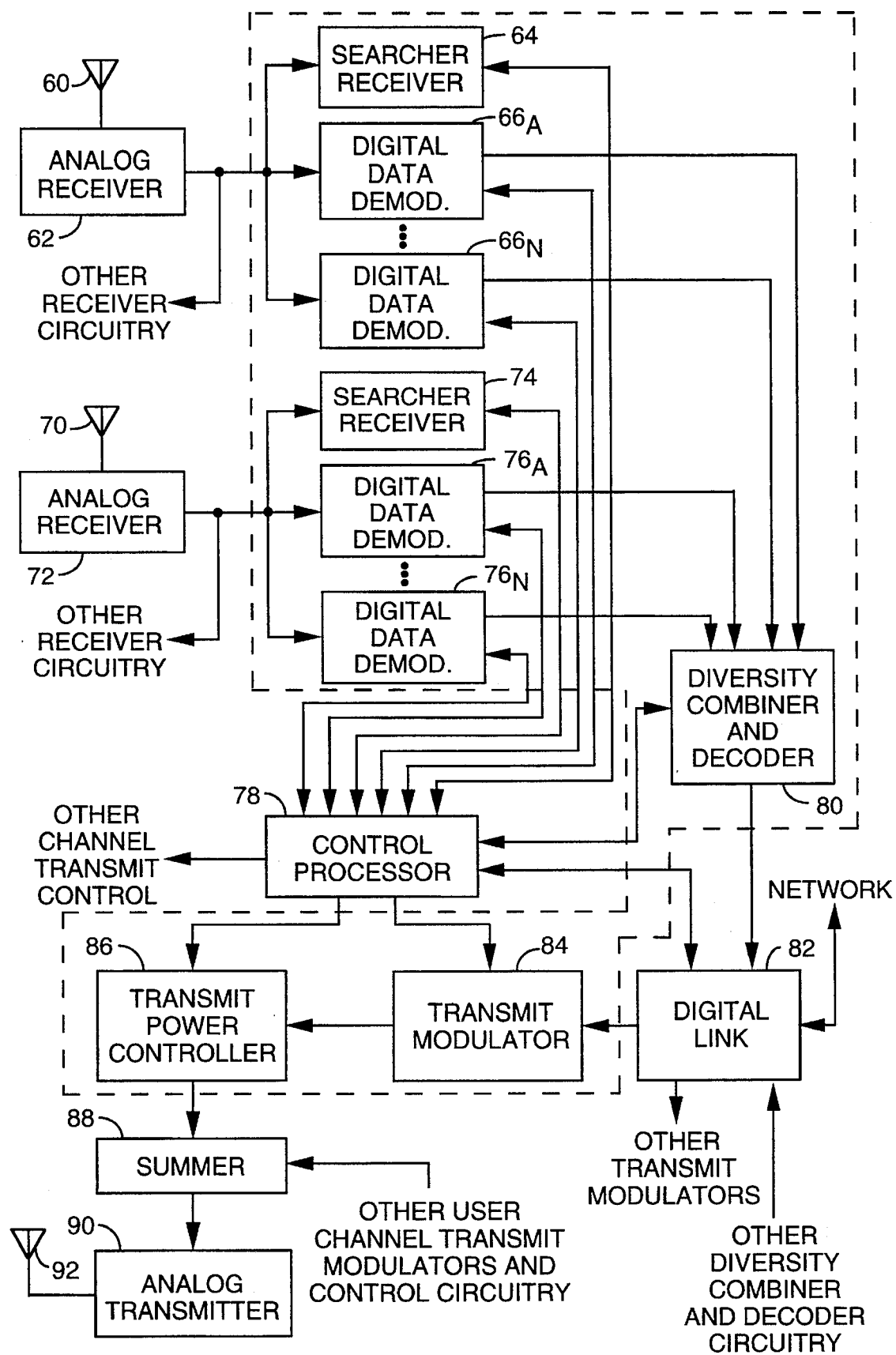
FIG. 2 illustrates a block diagram of exemplary gateway demodulation/modulation apparatus for the wireless communication system of FIG. 1.

An exemplary design for base station or gateway apparatus used to implement a CDMA communication system is illustrated in further detail in FIG. 2. In a typical base station, at least two receiver sections or systems are utilized, each having a separate analog receiver, and typically separate antenna, for effecting space diversity reception. In a gateway, multiple analog receivers are utilized to achieve frequency diversity, as discussed earlier. That is, in a gateway each analog receiver receives different frequency signals from different satellite beams or sub-beams. As desired, and cost permitting, separate antennas are also used to effect some of this signal reception. In either case, communication signals are processed substantially the same in each of the receiver sections and then undergo a diversity combination process. The elements within the dashed lines correspond to elements used to manage communications between one base station or gateway and one subscriber unit. The output of the analog receivers or receiver sections are also provided to other elements to be used in effecting communications with other subscriber units.

The transceiver or demodulator/modulator portion of the gateway illustrated in FIG. 2, has a first receiver section that uses an antenna 60 to receive communication signals; connected to an analog receiver 62 in which the signals are downconverted,; amplified, and digitized. Digitized signals are output from analog receiver 62 to at least one searcher receiver 64 and at least one digital data demodulator 66$_A$. Each demodulator forms one finger in a rake type signal receiver. Additional digital data demodulators 66$_B$–66$_N$ are used to obtain signal diversity for each subscriber unit or communication circuit being maintained, which may be optional for some system designs. Each finger or demodulator is assigned to track and demodulate subscriber communication signals traveling along possible alternate paths. These demodulators use slightly different timing in the demodulation process with a phase difference of at least one PN chip period. This provides diversity modes which are extremely useful in situations where many possibilities for multipath signals exist. In addition, this allows intentional creation of multipath signals by the communication system as desired to improve the communication link.

The gateway generally has additional receiver sections for accommodating communication signals at additional carrier frequencies, or using other distinguishing parameters. This is illustrated in FIG. 2 using a second such section which includes a second antenna 70, a second analog receiver 72, a second searcher receiver 74, and a second set of digital data demodulators 76$_A$–76$_N$. However, many such sections are typically used in gateways to accommodate all of the satellite beams and sub-beams being handled at any given time. At least one gateway control processor 78 is coupled to demodulators 66$_A$–66$_N$ and 76$_A$–76$_N$ along with searcher receivers 64 and 74. Control processor 78 provides command and control signals, as well as some data pathways, to realize functions such as, but not limited to, signal processing, timing signal generation, power and handoff control, diversity, diversity combining, and system interfacing with the MTSO. Another main control task performed by control processor 78, is Walsh sequence, transmitter, and demodulator assignments for subscriber communications.

Signal outputs from data demodulators 66$_A$–66$_N$ and 76$_A$–76$_N$ are coupled to one or more diversity combiner and decoders 80 which serve to logically combine signals output by receivers servicing a common subscriber unit, and provide a combined signal output to a digital link 82. Digital link 82 is also coupled to control processor 78, a transmit modulator 84, and typically to a MTSO digital switch or network. Digital link 82 serves to control or direct the transfer of decoded, un-encoded, and encoded data signals among diversity combiner and decoders 80, the MTSO network, and one or more gateway transmit modulators 84, as desired, all under the control of control processor 78.

Figure 3:
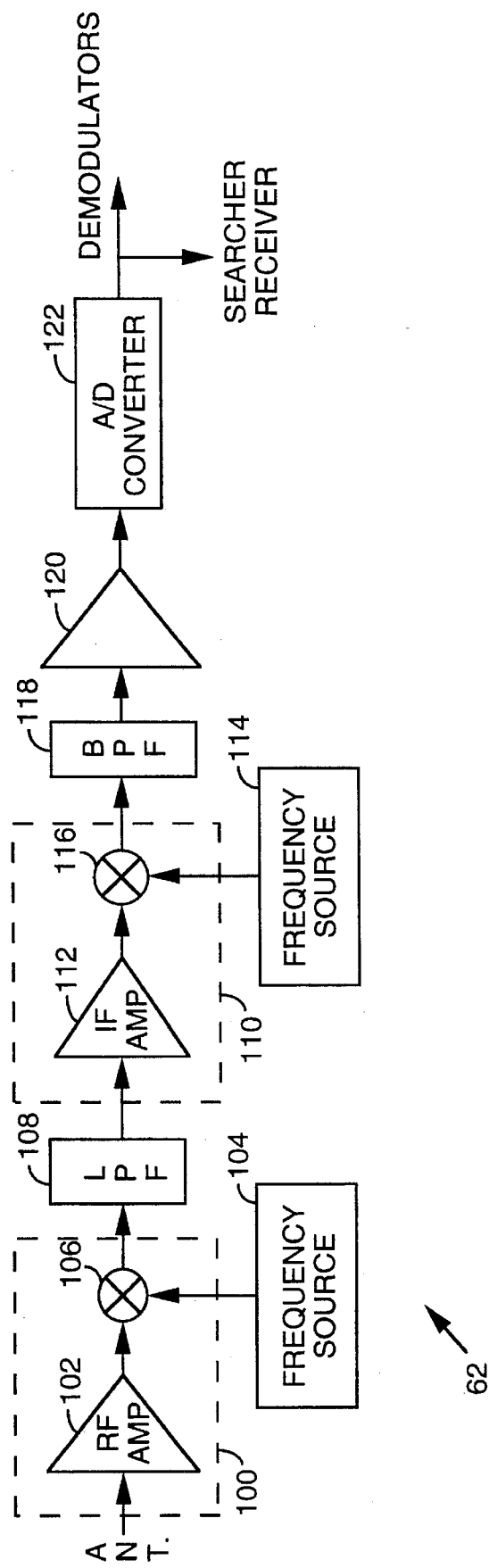
FIG. 3 illustrates an analog circuit useful for constructing analog receivers in FIG. 2.

Analog receiver 62 is illustrated in further detail in FIG. 3. As seen in FIG. 3, signals received by antenna 60 are coupled to a downconverter portion 100 where the signals are amplified at the input RF frequency, as needed, in an RF amplifier 102 and then mixed with the output of a reference frequency signal source 104 in a mixer 106 to translate amplified RF signals to a desired IF frequency. The resulting IF signals are transferred through a lowpass filter (LPF) 108, to an IF amplifier 112 for further amplification in another downconverter portion 110. Downconverter 110 translates amplified IF signals to a desired baseband frequency before they are transferred to an analog-to-digital (A/D) converter 122 where they are digitized at an appropriate clock rate. For the present example, a clock rate on the order of 9.8304 MHz would generally be used, which is 8 times the PN chip rate. Downconverter 110 uses a reference frequency signal source 114 and a mixer 116, and is followed by a bandpass filter (BPF) 118 and a bandpass amplifier 120. Although A/D converter 122 is illustrated as forming a part of receiver 62, it could easily reside elsewhere in the demodulation circuitry, for example forming a closely coupled part of the either digital data demodulators 66, 76 or searcher receivers 64, 74.

Digitized signals output by A/D converter 122 to demodulators and searcher receivers 66 and 74 consist of combined I and Q channel signals in this example. However, those skilled in the art will readily appreciate that A/D converter 122 can be constructed so as to provide channel splitting with two separate A/D converter paths prior to digitizing the I and Q channels, rather than splitting the digitized I and Q channel signals after conversion. This splitting simply alters the nature of the data busses used to transfer the data to other receiver elements and the number of inputs associated with each receiver. Various schemes for RF-to-IF-to-Baseband frequency conversion and analog-to-digital conversion for I and Q channel signals are well known in the art. The second receiver section processes received communication signals in a manner similar to that discussed with respect to the first receiver section of FIG. 2.

Weighted symbols are output from demodulators 66$_{A-N}$ and 76$_{A-N}$ and provided as inputs to diversity combiner and decoder circuitry 80. Combiner and decoder 80 includes an adder which adds the two sets of weighted coefficients for the symbols from demodulators 66$_{A-N}$ and 76$_{A-N}$. The correspondence is determined by which user the signals are directed to, or the communication link or circuit for which they represent at least one path. The resulting combined coefficients are then examined or compared with one another to determine the largest coefficient value among the coefficients, which is used to determine a set of decoder weights and symbols for use by a decoder implemented in circuitry 80. For example this information can be used by a Viterbi algorithm decoder to determine the most likely information bit sequence.

Signals from the MTSO, within the communication system, or from other combiners, are coupled to an appropriate transmit modulator for transmission to a recipient subscriber using digital link 82. The circuitry used to construct digital link 82 is well known and typically involves various known digital data switching and storage components. Transmit modulator 84 spread spectrum modulates data for transmission to an intended recipient subscriber unit and provides the resulting signal to a transmit power controller 86 which provides control over the transmission power used for the outgoing signal. Further details with respect to the structure and operation of exemplary transmit modulators 84 are discussed in U.S. Pat. No. 5,103,459, entitled "SYSTEM AND METHOD FOR GENERATING SIGNAL WAVEFORMS IN A CDMA CELLULAR TELEPHONE," which is assigned to the assignee of the present invention and incorporated herein by reference.

The output of power controller 86 is summed with the output of other transmit modulator/power control circuits, whose outputs are directed to other subscriber units on the same transmission frequency, in a summation element or means 88. The output of summer 88 is provided to an analog transmitter 90 for further amplification at a desired frequency and output to antenna 92 for radiating to subscriber units through satellite repeaters. Control processor 78 also controls the generation and power of the pilot, sync channel, and paging channel signals and their coupling to power controller 86 before being summed with the other signals and output to antenna 92.

Searcher receiver 74 is used in gateways to scan the time domain about the received, subscriber originated, signal to ensure that the associated digital data receivers 66 and 76, if used, are tracking and processing the strongest available time domain signal. Searcher receivers are typically used by the control processor to determine which demodulators are to be assigned to the analog outputs. Searcher receiver 74 provides a signal to gateway control processor 78 which in turn provides control signals to digital data demodulators 66 and 76 to select the appropriate received signal inputs (timing) for further processing. Each demodulator is then responsible to track the timing of signals it is receiving using one of several known techniques.

One known tracking technique is the 'early/late' technique where a received signal is correlated with early and late local reference PN sequences. The difference between these correlations averages to zero when there is no timing error. Conversely, in the presence of timing errors this difference indicates the magnitude and sign of such errors, and the demodulator's timing is adjusted accordingly. An early/late timing loop serves to lock onto or track the frequency and phase of the carrier signal with the aid of a lock detector.

The signal processing in the gateway receivers differs in several aspects from the signal processing undertaken by similar elements in the subscriber unit. As previously discussed, a gateway generally transmits a pilot signal and uses singular orthogonal code sequences to cover the data symbols being transferred to each subscriber unit. The subscriber unit, on the other hand, does not typically transmit a separate pilot signal that can be used for coherent reference purposes in signal processing at the gateway, although cost and technology permitting this could be accomplished. Therefore, the subscriber-to-gateway or -cell link is generally characterized by a non-coherent modulation and demodulation scheme. In this scheme, the subscriber unit encodes the data symbols to be transmitted using several orthogonal functions for groups of code symbols, here 64 Walsh code sequences for every 6 code symbols. That is, the binary values of every group of 6 data symbols is used to select one of 64 Walsh functions or codes which are pre-assigned index values for this purpose. On the receiving end, each Walsh code is detected and mapped into its corresponding symbol sequence according to the preselected index pattern, to yield the original 6 symbols which are in turn further processed to provide data.

Figure 4:
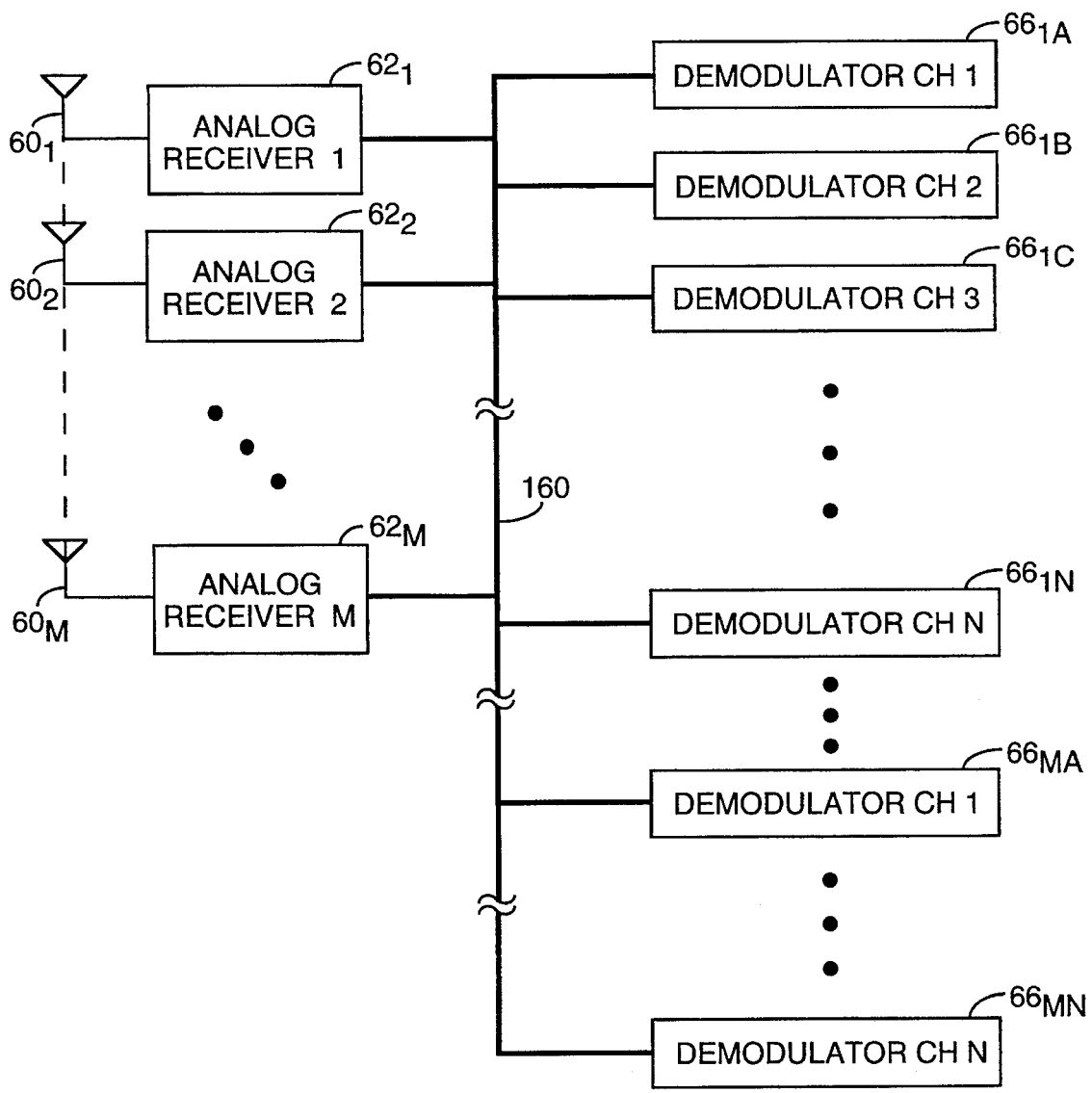
FIG. 4 illustrates a block diagram of a multiple finger demodulation architecture for a modem section of the gateway of FIG. 2 using a large number of receivers.

The communication signal reception portions of gateways 22 and 24, as partially illustrated in FIG. 2, are presented in FIG. 4. As seen in FIG. 4, there is an array of 'M' analog receivers 62 connected to at least one corresponding antenna 60 which uses corresponding A/D converters $122_M$, not shown. Multiple antennas can be employed as desired, especially to service multiple satellites or satellite constellations. Each A/D converter provides digital form data or streams of data symbols on a data bus 160 for a series of demodulation units $66_{MN}$. Using the number 76 to designate a second set of demodulators is eliminated in favor of the M subscript to indicate that there are up to M analog input paths or analog signals being received by the gateway at any given time, using an array of antennas with associated signal processing elements. The value for M depends on specific communication system design parameters known in the art, with exemplary values being on the order of 32 but less than or equal to 64 per frequency channel, in accordance with the number of receivers, as discussed earlier. Again, the number of analog receivers being used depends for the most part on the number of satellites and beam communication signals (frequencies and paths) to be accommodated by the gateway.

The value for N depends on the number of communication channels or subscriber unit signals to be accommodated on each carrier signal processed by an analog receiver. This number typically approaches a current limit on the order of 128 (the Walsh code length n), since there might be at least 128 channels of information to track for 125 subscribers, and pilot, sync, and paging signals for each analog signal path or input. If N is less than 128, that is N less than n, then a reasonable level of diversity processing is possible only during average or low user access periods but no diversity is available as the system approaches full capacity, as when all N for each M are used for different users. That is, diversity is possible for a number of users for each $M^{th}$ analog path, as long as there are substantially less then n active users for that analog path. Once the number of active users per $M^{th}$ analog reception path obtains or exceeds N, then diversity is no longer possible.

Therefore, for systems where higher average traffic is expected, N would have values on the order of 128 to assure diversity reception for each subscriber unit signal across all M analog input channels. At the same time, the value or product NM, the total number of channels times the total number of analog receivers, approaches 4096 or more demodulators at this upper limit. Such an excessively large number of demodulators generally wastes resources, and provides a very complex system to construct and manage. It has been discovered that generally providing only around 4 to 6 demodulators for each of an average number of expected users for each of the M analog receivers provides more than enough system capacity. Therefore, NM could generally be limited to around 256–384 demodulation elements for most systems.

It can be readily understood from the number of analog receivers and demodulators being used that the amount of data being transferred between elements on internal data buses 160 is very large and the control function for such buses is very complex. For example, typical data rates within communication system 10 are around 9600 bps. Even when data, such as low density data or voice, originates at a lower rate, it is generally repeated to provide frames of data with fixed timing at the 9600 bps rate, as it is advantageous to use fixed rate signals. The data is generally encoded and interleaved to form 9600 encoded symbols per second which is in turn modulated by the spreading sequences to become 1.2288 Mbps communication signals.

Each antenna 60 or antenna input and corresponding analog receiver or receivers $62_M$ provide data from received communication signals onto data bus 160, as data arrives over each analog signal path from each satellite being accommodated. Therefore, with 30 or more receivers receiving signals from each of 4 or more satellites at a given time, the data transfer rate approaches five or more gigabits per second (Gbps). This rate is determined from the system PN code chip rate, here 1.2288 Mbps, using eight times oversampling (×8) of received signals for both I and Q channels (×2) and also using 4 bits per sample (×4). These parameters result in a data rate of around 80 megabits per second (Mbps) per carrier or satellite beam (as in 1.2288×8×2×4= 78.64 Mbps). When using say sixteen beams per satellite repeater (×16) and communicating with up to four satellites in the communication system at any time (×4), the total data rate for data being transferred on bus 160 by all M analog receivers within one gateway approaches 5 Gbps or more (78.64×16×4=5.033 Gbps).

Moreover, with a large number of demodulators, the wiring or cabling needed in a gateway to implement this circuit design, to redirect signals to all of the possible demodulators used with each of the analog receivers, becomes very complicated. This leads to increased construction expense and decreased reliability. It is estimated that even a simple gateway architecture would employ at least 2,000–3,000 such cables for signal transfer.

Figure 5:
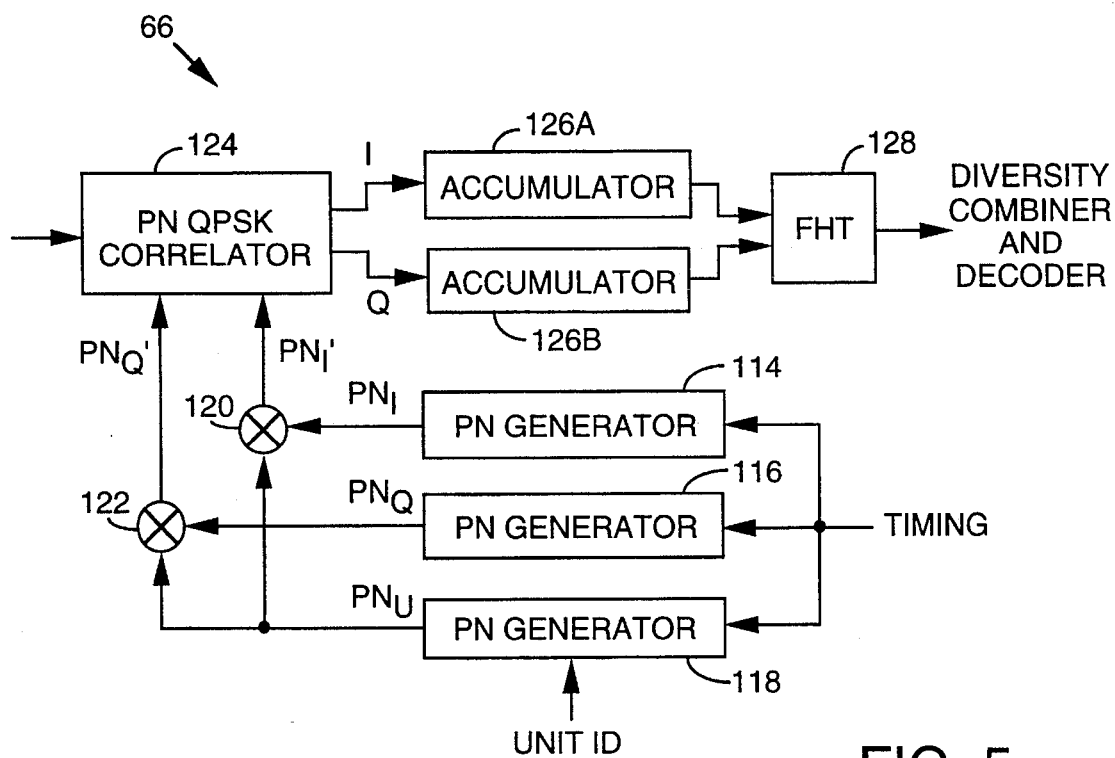
FIG. 5 illustrates a possible demodulation circuit useful for constructing digital data receivers shown in FIG. 2.
Figure 6:
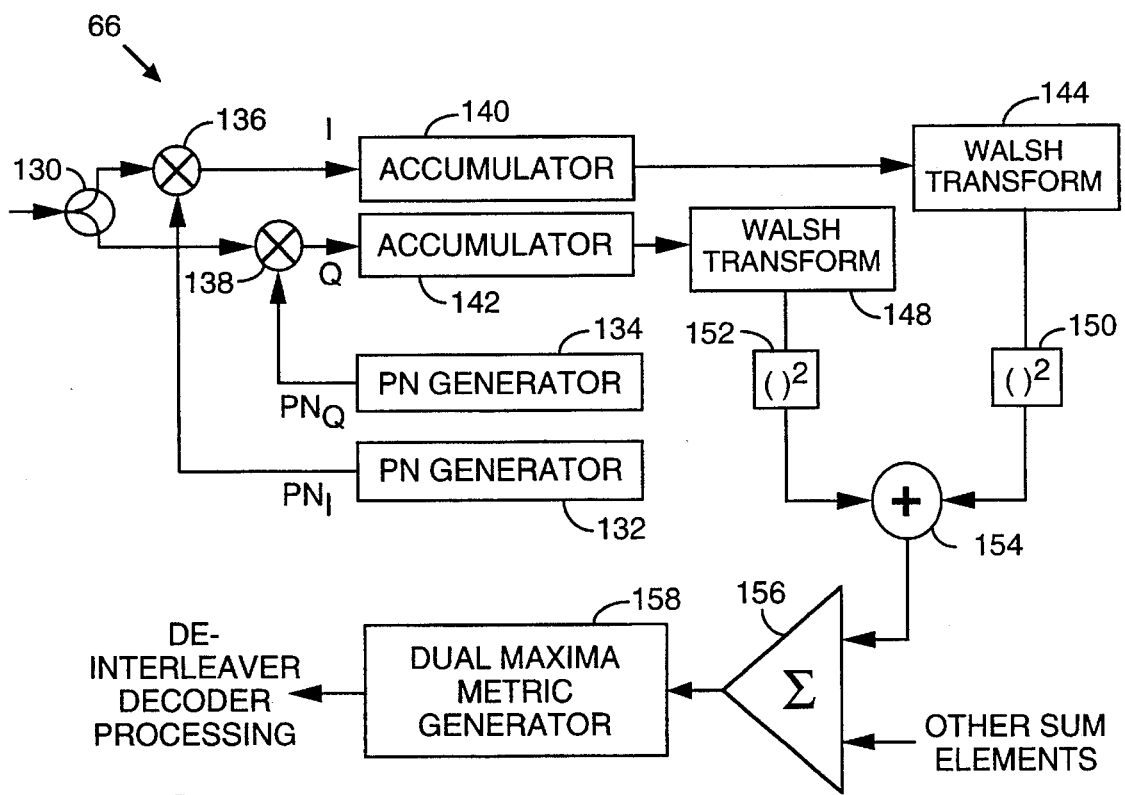
FIG. 6 illustrates a second possible demodulation circuit useful for constructing digital data receivers shown in FIG. 2.

In order to decode the spread spectrum signals transmitted to a particular gateway demodulator through which a subscriber unit communicates, the proper PN sequences must be generated and applied. There are a several techniques that can be used within each of the demodulators $66_{MN}$ ($66_N$ or $74_N$), two of which are illustrated in FIGS. 5 and 6. However, those skilled in the art will readily recognize that these techniques are used only for the purposes of illustrating the complexity of the data structures on bus 160 when using current communication system architecture designs. Other demodulation techniques may be used within the teachings of the present invention and those illustrated are not intended as limitations in any manner on the operation of the invention.

As illustrated in the technique shown in FIG. 5, digitized I and Q channel signals or data samples from an A/D converter are input into a PN QPSK correlator 124 along with appropriate $PN_I'$ and $PN_Q'$ sequences produced within demodulator 66. QPSK correlator or despreader 124 despreads the composite I and Q component signal samples so as to extract the transmitted I and Q channel data symbols. In this approach, each demodulator includes two PN generators 114 and 116, which generate the two $PN_I$ and $PN_Q$ sequences, respectively, as the In-Phase (I) and Quadrature (Q) channel PN sequences. Control processor 78 provides timing and sequence control signals to these generators. These two PN sequences represent the short outer PN code sequences which are common to the gateway modems and all subscriber units, in the modulation scheme discussed earlier. Such a PN generator circuit is disclosed in U.S. Pat. No. 5,228,054 entitled "POWER OF TWO LENGTH PSEUDO-NOISE SEQUENCE GENERATOR WITH FAST OFFSET ADJUSTMENTS," issued Jul. 13, 1993, and assigned to the assignee of the present invention, and incorporated herein by reference.

In the apparatus of FIG. 5, demodulators $66_{MN}$ may also include a long code PN generator 118 which generates a long subscriber or user specific PN code sequence $PN_U$ for use in communicating with the subscriber unit during a given communication link. PN generator 118 can be constructed using a variety of known elements configured for this purpose. For example, a maximal linear sequence generator could be used that generates a very long PN code time shifted in accordance with an additional factor such as a subscriber unit address or unit electronic ID. The specific PN code used is selected under the control of central processor 78, generally using 'set-up' information also provided by the gateway, or MTSO 12, to the subscriber units in the synchronization signal. This sequence can be dynamically changed as desired, and may be truncated to achieve a desired length. In the alternative, a non-linear encryption generator, such as an encryptor using the data encryption standard (DES), may be utilized in place of PN generator 118 as desired.

The Walsh code sequence from generator 118 is logically combined, such as by using multiplication, or in some configurations by using an exclusive-OR operation, with the $PN_I$ and $PN_Q$ sequences in a pair of logic elements 120 and 122, respectively, to provide the sequences $PN_I'$ and $PN_Q'$. Sequences $PN_I'$ and $PN_Q'$ are in turn transferred to PN QPSK correlator 124 which correlates the I and Q channel data with these sequences and provides correlated I and Q channel outputs to a pair of accumulators 126A and 126B, respectively. Therefore, the (digitized) communication signals received by the gateway from subscriber units are demodulated by both user specific PN code sequences and the short code $PN_I$ and $PN_Q$ sequences.

Accumulators 126A and 126B collect and temporarily store symbol data over a predefined time interval, for example one Walsh symbol or 256-chip period. In the exemplary embodiment, this corresponds to 1/4800 second, that is, 4800 symbols per second, but other rates can be used. Essentially, data is converted from a serial symbol stream to parallel symbol sets by the accumulators. The output from accumulators 126A and 126B are the respective symbol data for I and Q signal components or channels and are input at the symbol rate of 4800 symbols/second into a Fast Hadamard Transformation (FHT) device 128. Accumulators 126A and 126B are then cleared or reset subsequent to data output so as to accumulate a next set of samples.

FHT device 128 acts as a Walsh code transformer that converts each set or sequence of 64 Walsh chips into a measure or estimate of the likelihood that the energy in a received signal corresponds to one of 64 Walsh functions or code sequences which represent originally encoded data from subscriber units. The actual output of FHT 128 comprises a metric as to the possible code being sent which must be further processed to determine the transmission contents in a non-coherent demodulation scheme. The resulting channel data is output from (FHT) device 128 to a diversity combiner and decoder where it is combined with data from other signal paths, de-interleaved, and decoded.

In a second approach, the demodulators are configured to receive signals over an assigned communication channel, despread the signal and transform groups of samples of the signal into grouped measures of confidence that particular samples correspond to particular orthogonal codes. The largest measure of confidence and a corresponding index data symbol are then used to generate soft decision data. The soft decision data within each received frame of data is then de-interleaved and used to generate soft decision transition metrics, which in turn are used to generate estimated data bits using known decoding techniques.

An exemplary structure for implementing these steps is shown in FIG. 6 where a dual maxima metric generator is employed to form soft decision transition metrics for maximum likelihood decoding techniques. This structure also allows a single dual maxima metric generator to bridge across multiple demodulators. This technique is described in further detail in co-pending U.S. patent application Ser. No. 08/083,110, entitled "NONCOHERENT RECEIVER EMPLOYING A DUAL MAXIMA METRIC GENERATION PROCESS," U.S. Pat. No. 5,442,627, assigned to the assignee of the present invention, and incorporated herein by reference.

The input signal is again separated into I and Q components using a signal splitter 130 and then multiplied by $PN_I$ and $PN_Q$ code sequences from two PN generators 132 and 134 in multipliers 136 and 138, respectively. The products from this multiplication process are generally accumulated in accumulators 140 and 142, respectively, and subsequently output to a set of orthogonal code transformers 146 and 148 where the Walsh codes represented by the data symbols are determined.

A predetermined number of sampled signals, such as 64 samples, are independently input into orthogonal code transformers 146 and 148 which comprise fast Hadamard transformers that generate a plurality of output signals, 64 when 64 sample length groups are input. Each transformer output signal corresponds to a measure of confidence that a particular group of sampled signals corresponds to a particular orthogonal code. In addition, each transformer output signal has an associated index data symbol, either explicitly or implicitly, which indicates which particular orthogonal code that transformer output signal corresponds to (64 sample length groups use 6 bit length indexes).

Each I and Q transformer output signal is squared by multiplication or squaring mechanisms 150 and 152, respectively. Subsequently, a group of decision values is generated using summation element or adding mechanism 154 to add together each pair of squared signals. That is, one squared signal from each signal squaring mechanism is paired with other squared signals that have an associated index indicating correspondence to the same orthogonal code. This summation produces an energy level associated with each particular orthogonal code.

Each group of decision values from separate demodulators $66_N$ may be transferred to a summation element 156 connected in a series with each of their respective outputs to form a composite summation of decision values for several diversity receiver channels, according to associated symbol indexes. The combined decision values are input into a dual maxima metric generator 158 where a single set of aggregate soft decision data are produced. As before, combined output data and aggregate soft decision data may also be transferred either in series or in parallel form.

Aggregate soft decision data are then input into de-interleaver and decoder circuitry which de-interleaves aggregate soft decision data at the individual data level. The operation of de-interleaving is well understood in the art and is not discussed further here. The de-interleaved soft decision data are input to a decoder which uses one of several known decoding techniques such as maximum likelihood decoding to generate estimated traffic channel data bits for the originally transmitted data signal.

However, as stated above, using these or other current approaches to signal demodulation requires the transfer of excessively large amounts of data on bus 160. Therefore, a new gateway architecture was developed by the inventor that decreases the amount of data being transferred to multiple demodulators for purposes of diversity signal processing. By reallocating resources and applying certain resources directly to the output of each analog receiver prior to data transfer on internal data buses or conductors, the data rate is greatly reduced before being combined into user channels. In this scheme, transfer buses or conductors within a gateway can readily accommodate the desired large amounts of data and resulting data transfer rates using current technology.

This is accomplished by using a series of A/D converters, as before, on the output of each analog section and also applying the $PN_I$ and $PN_Q$ sequences across all received signals for each analog receiver. That is, all signals being received and processed by each analog section are despread using the appropriate short PN sequences before being transferred to other channelized elements for further processing. This means that the despreading is accomplished up to N times in parallel for each of the M analog receivers. Channels are despread substantially independent of each other in order to accommodate differences in timing that can occur for the different signals relative to the fixed gateway timing. The despreading automatically reduces the data rate for the inputs to the gateway demodulators. When used in combination with other resource allocation steps, this results in a more efficient gateway signal processing architecture.

Figure 7:
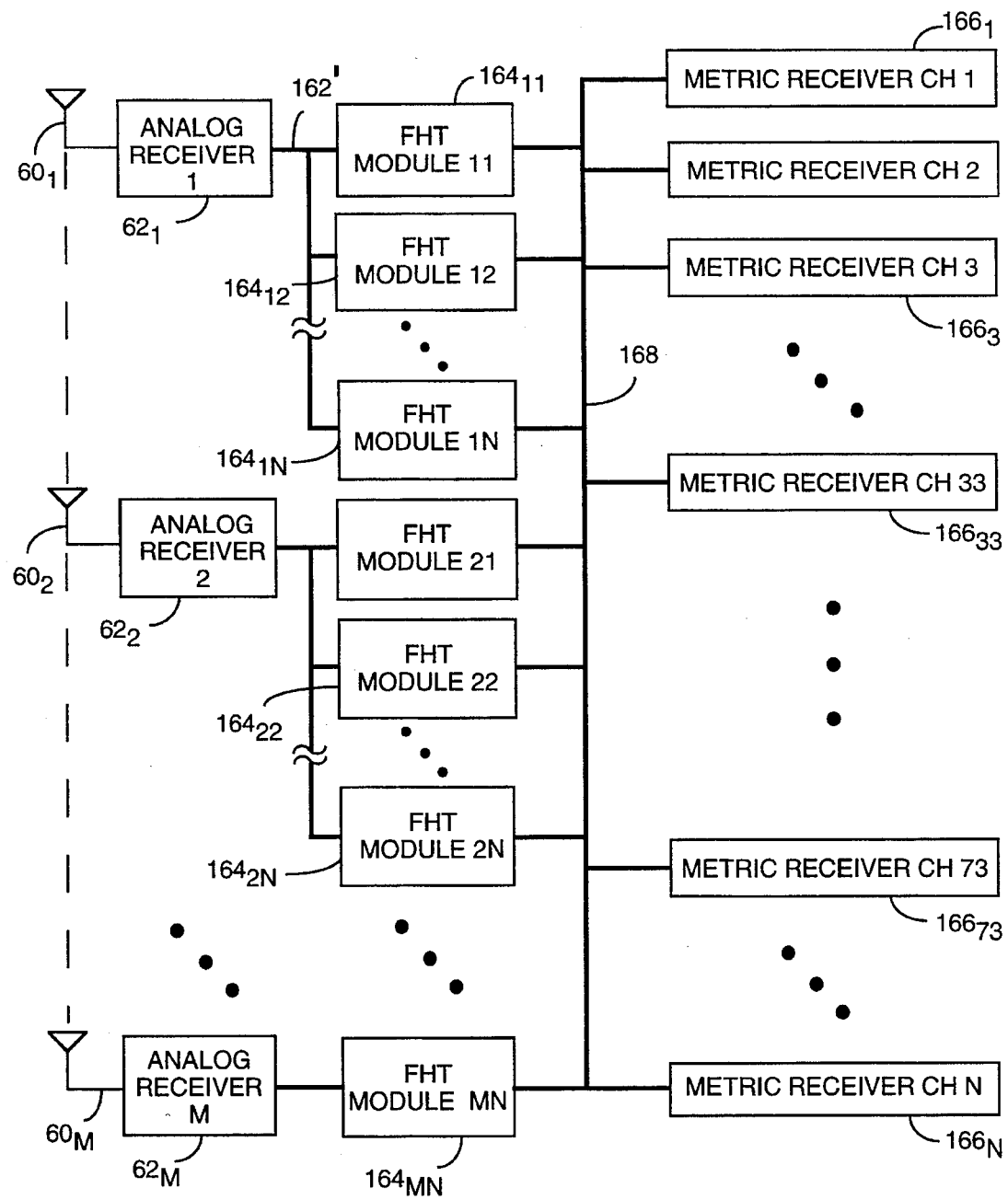
FIG. 7 illustrates a new gateway architecture using multiple distributed data receivers.

A new gateway signal reception architecture operating according to the principles of the present invention is illustrated in block diagram form beginning in FIG. 7. In FIG. 7, one or more antennas $60_M$ and analog receivers $62_M$ are used as previously described in FIG. 4. However, the outputs from A/D converters $122_M$ (not shown in 62) are directed to a series of corresponding FHT modules $164_{MN}$ that are associated with each signal receiving section $62_M$ and not simply a demodulator $66_N$. Here, N is used to indicate the number of FHT modules used per analog receiver and corresponds to the total number of channels n being processed by the gateway through each analog receiver. FHT modules $164_{MN}$ are used to generate signal metrics which are then transferred to a series of N metric receivers $166_N$, where N is typically on the order of 6–8 but can be equal to 'n' (Walsh function length), for further processing to generate the output data. Metric receivers $166_N$ comprise circuitry similar to the dual metric receiver described above for converting energy metric data into appropriate form for decoding, and can be manufactured using one of several devices known in the art.

Figure 8:
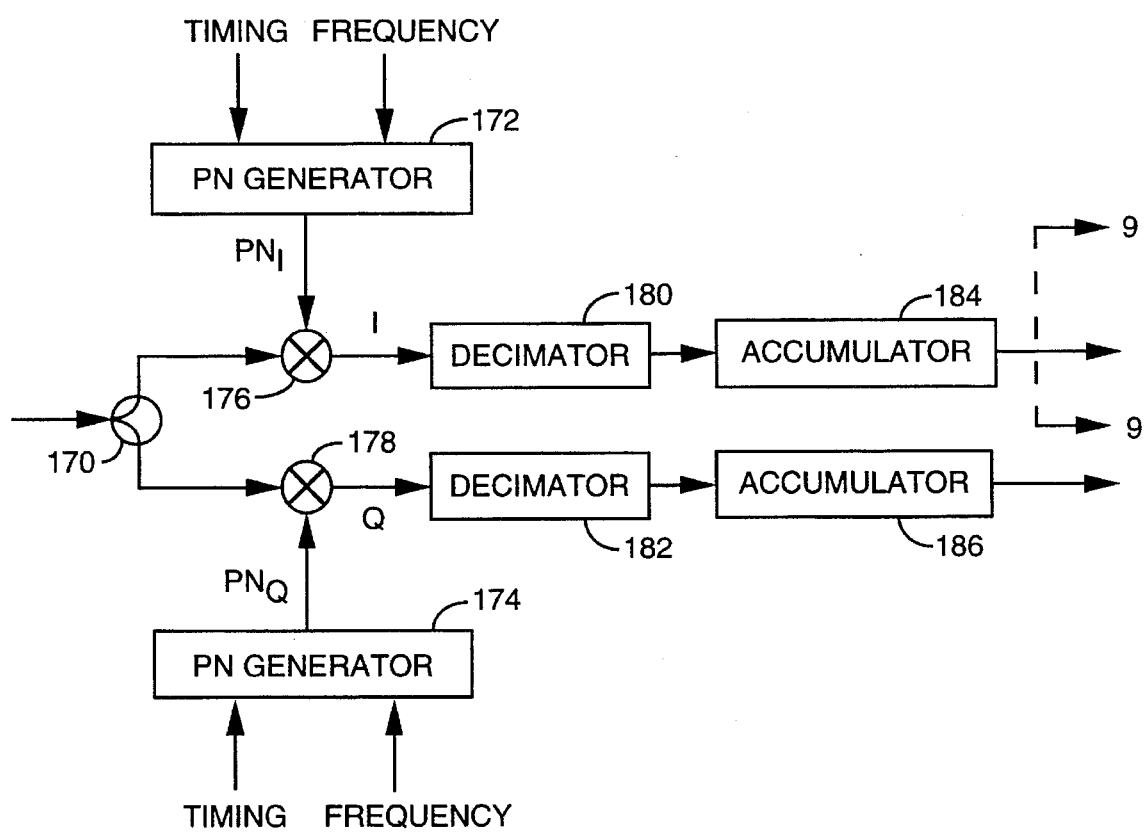
FIG. 8 illustrates an input portion of an exemplary FHT module for use in the gateway architecture of FIG. 7.
Figure 9:
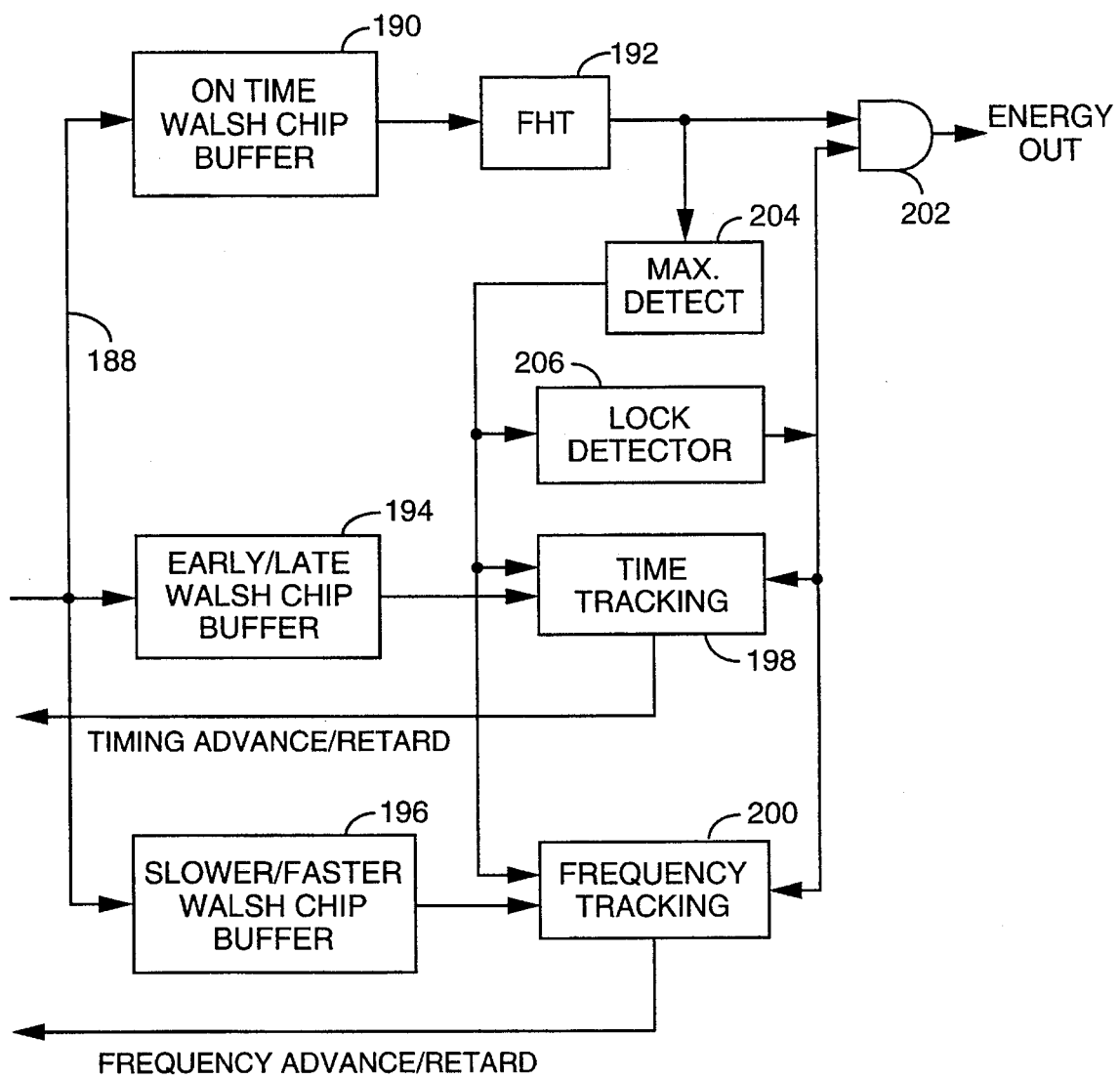
FIG. 9 illustrates an output portion of the exemplary FHT module of FIG. 8.

A more detailed view of FHT modules $164_{MN}$ is presented in FIGS. 8 and 9. A receiving/despreading portion, also termed a demodulator front end (DFE), is shown in FIG. 8, and an output/metric generation portion, also termed a demodulator back end (DBE), is shown in FIG. 9. As illustrated in FIG. 8, communication signals received from antennas 60 are processed in analog receivers 62, as before, and digitized I and Q channel signals from A/D converters are separated into I and Q components using a signal splitter 170. The I and Q components are then multiplied by appropriate gateway $PN_I$ and $PN_Q$ code sequences from two PN generators 172 and 174, in multipliers or logic elements 176 and 178, respectively. The products from this multiplication are generally accumulated in accumulators 184 and 186, respectively, and then output to a set of orthogonal code transformers where energy metrics for estimating the likelihood of the Walsh codes represented by the received data symbols are determined. Therefore, the (digitized) communication signals received from subscriber units by each gateway analog receiver from an antenna are demodulated or despread using the short $PN_I$ and $PN_Q$ code sequences before further processing or signal transfer occurs.

Typically, two PN generators 172 and 174 are used to generate the two $PN_I$ and $PN_Q$ code sequences, respectively. These two PN sequences represent the outer PN code sequences discussed earlier, and can be generated as previously discussed. Control processor 78 provides timing and sequence control signals to these generators. Additional, skewing or deskewing circuits and other timing elements, as known in the art but not shown here for purposes of clarity, can be used to affect the timing of the application of PN codes from PN generators 172 and 174.

Accumulators 184 and 186 collect and temporarily store symbol data provided by multipliers or gates 176 and 178, respectively, over a predefined time interval, for example one or more symbol or 128-chip periods. If accumulators 184 and 186 store the symbol data for relatively long periods, on the order of many symbol periods, then the subsequent processing elements have more time to scan these signals for possible subscriber unit signals or channels of data on the carrier being received. Typically, a set of decimators 180 and 182 are connected in series with accumulators 184 and 186, respectively, which establish a sampling rate for data presented to subsequent processing elements. This also serves to reduce the amount of data transferred through the accumulators, further reducing the data rate to be handled by metric receivers. The outputs from accumulators 184 and 186 are transferred to subsequent processing stages over a module bus 188.

The despread signals are then further processed to generate desired symbol energy metrics. This is typically accomplished by using an FHT device to interpret the data values or decode the Walsh coding used for the reverse communication link. This process does not make any assumptions as to which subscriber the signal is directed to, but simply retrieves data embedded within signals. Apparatus for implementing the DBE portion of the FHT module or function and realizing the metric generation output is illustrated in further detail in FIG. 9. One set of elements shown in FIG. 9 is used in association with each set of elements illustrated in FIG. 8 (DFE) to complete an FHT module for each analog finger. However, if using some form of time sharing or hypothesis selection, fewer DBE elements or devices could be used to service the outputs for each set of DFE devices in the overall FHT module. That is, selection of only certain ones of the DFE outputs for further processing could be accomplished based on such factors as minimum likelihood or some data could be combined before processing.

In FIG. 9, the symbol data stored in accumulators 184 and 186 is transferred to an 'on time' Walsh chip accumulator or buffer 190, and 'early/late' and 'slower/faster' chip buffers or accumulators 194 and 196, respectively. These buffers comprise circuit elements well known in the art for storing signal information, or bits, as it is transferred into this portion of FHT modules $164_{MN}$. A series of buffers, registers, or predefined memory elements operating under the Control of command units or control processor 78 can be used to accomplish this function. Depending on average usage within gateways, some of these elements can be shared between processing fingers. These buffers receive and accrue the symbol data so that it can be appropriately processed.

Early/late buffer 194 is used to provide data one chip period late and one period ahead of the data being provided from on time buffer 190. Typically this is accomplished by delaying the output of 'on time' buffer 190 by a chip period so that non-delayed data provides the relative one chip 'early' data, and then delay the data in buffer 194 another chip period to produce the 'late' data. The output of early/late buffer 194 data is input into a time tracking loop (TTL) 198 where the timing of the chip sequences is tracked in order to set the timing for PN sequence despreading and other processing within FHT modules $164_{MN}$. One output of time tracking loop 198 is transferred either directly or over bus 188 to other elements, such as PN generators 172 and 175 that use the communication signal timing information available from this element.

At the same time, slower/faster chip buffer 196 receives and transfers data to a frequency tracking loop 200 where the frequency and phase of the carrier signal for the data being received by corresponding analog receiver $62_M$ is determined. This information is used by other elements within the gateway, such as analog receivers $62_M$ and control processor 78 to adjust the tracking of analog processing elements to correctly lock onto the received communication signals.

The data stored in buffer 190 is transferred to a fast Hadamard transformation device 192 (FHT) where the energy metrics for the symbol data are determined. The structure and operation of such FHT devices are understood by those skilled in the art, and also seen in the patents referenced above. The output of FHT device 192 is transferred to an output control gate or switching element 202 and a maximum energy level detector 204. An exemplary output control element is shown in FIG. 9 as a two-input AND gate. The metric data is provided as one input to gate 202 and an output control signal from a signal lock detector 206 is provided as the second, and output controlling, input.

FHT device 192 has common properties across all of the signals being processed for this gateway or certainly within a given beam/sub-beam. Therefore, a smaller set of FHT devices could service the total number of channels and receivers using time shared hardware and storage elements according to the service needs of the communication system, as desired. In addition, a programmable FHT element can be used to dynamically adjust for desired changes within communication system 10 or the gateway.

The output of maximum energy level detector 204 is used by lock detector 206 to determine when FHT device 192 is decoding symbol data correctly. That is, lock detector 206 determines when the timing and frequency tracking elements in FHT module $164_{MN}$ are correctly tracking a subscriber signal and FHT device 192 is decoding appropriately grouped symbol data corresponding to transmitted symbol data. At this point, lock detector 206 issues an output signal that locks the time tracking loop and frequency tracking loops at their respective current settings to continue tracking the frequency, at least for a predetermined period of time such as a 7 symbol period, and enables the output of gate 202.

As can clearly be seen, if each of these the elements 170–206 are duplicated N times per M receivers, there is a larger number of basic circuit elements being employed than previously described for a typical terrestrial repeater base station. However, these circuit elements are well developed and understood in the art and can be inexpensively duplicated using current integrated circuit technology. Such elements consume little space and are very reliable, which contributes to a very reliable gateway architecture.

The output of gate 202 is provided to metric receivers $166_N$ which act as post-processors for each communication circuit or subscriber unit channel within the gateway. The output from each DBE portion of each FHT module is directed to a single channel metric receiver. That is, each FHT module directs its output to a metric processing element corresponding to a single users channel as opposed to the previous approach of directing a digitized receiver output to every channel receiver. The outputs from FHT modules associated with each analog receiver $62_M$ that represent signals intended for the same communication channel but arriving over different analog paths, are directed to appropriate channel metric receivers where signals from different modules are also combined.

At this point, the data rate has decreased dramatically to the 4800 bps data rate for encoded symbol data. Metric receivers $166_N$ each perform diversity combining and other processing steps known in the art for combining the energy metrics into an estimate of the data being received, which was discussed earlier, and further detail of such circuitry is not included here. The data output from metric receivers $166_N$ can then be processed in the same manner as known in the art.

What has been described then is a new method and apparatus for demodulating communication signals so that the data rate being accommodated within later signal processing stages of a gateway architecture is reduced and the complexity of signal transfer interconnections is also reduced. Instead of presenting all analog receiver outputs to all demodulators for processing relative to one user in each demodulator, each analog signal is demodulated relative to multiple users independent of other analog signals. Using this approach, metric data is produced that is transferred at a lower data rate and then combined and decoded on a user or single channel basis. This provides both greater efficiency in signal processing and decreased cost and complexity with increased reliability.

The previous description of the preferred embodiments is provided to enable any person skilled in the art to make or use the present invention. The various modifications to these embodiments will be readily apparent to those skilled in the art, such as the number and type of antennas and analog receivers, and the generic principles defined herein may be applied to other embodiments without the use of the inventive faculty. Thus, the present invention is not intended to be limited to the embodiments shown herein but is to be accorded the widest slope consistent with the principles and novel features disclosed herein.

I claim:

1. A method for receiving signals in a spread spectrum communication system in which information is communicated by orthogonally encoded channels within communication signals, comprising the steps of:

receiving communication signals over one or more diversity transfer paths from one or more system subscribers using one or more analog receivers, and converting them to digital communication signals;

applying said digital communication signals to a corresponding set of demodulating modules connected to each analog receiver, the number of modules being equal to the product of a predetermined maximum number of subscribers to be serviced by a receiver and a maximum expected average number of signal paths over which communication signals are to be received from each subscriber;

despreading each of said digital communication signals using preselected pseudorandom noise (PN) type code sequences in one portion of said demodulating modules;

transforming at least a preselected number of despread digital communication signals each into energy metric signals indicative of energy values associated with encoded data in another portion of said demodulating modules; and transferring resulting energy metric signals corresponding to signals intended for a subscriber as an input to at least one metric receiver pre-assigned to said subscriber from a plurality of metric receivers.

2. The method of claim 1 wherein said despreading step generates despread digital communication signals in the form of encoded data symbols and said transforming step comprises the step of transferring encoded data symbols for each signal path to one of a plurality of orthogonal function transformers each for generating symbol energy metrics for a channel operating through a corresponding analog receiver.

3. The method of claim 2 further comprising the step of summing symbol energy metrics received at inputs of each of said metric receivers from multiple transformation steps to generate a single channel symbol energy metric for deriving channel data.

4. The method of claim 2 wherein said orthogonal function transformers comprise Fast Hadamard Transformers.

5. The method of claim 1 wherein each of said metric receivers corresponds to a single encoded signal channel to be processed.

6. The method of claim 1 wherein said analog receivers are configured to receive signals of at least one carrier frequency and convert said signals to digital communication signals at predetermined sampling rates.

7. The method of claim 1 wherein said analog receivers are provided within a gateway type base station and at least one satellite based repeater is employed to transfer said communication signals from subscriber units within said communication system to said analog receivers.

8. The method of claim 7 wherein there are at least two satellites in communication with said gateway at any given time.

9. The method of claim 1 wherein said preselected pseudonoise (PN) sequences are also used to modulate in-phase and quadrature components of digital data signals prior to transmission to intended recipients.

10. The method of claim 9 further comprising the steps of tracking a relative time difference between received communication signals and a phase of said PN sequences being used in despreading, and providing a timing adjustment signal to indicate sign and magnitudes of any difference.

11. Apparatus for receiving signals in a spread spectrum communication system in which information is communicated over orthogonally encoded communication channels within spread spectrum communication signals transmitted by system subscribers, comprising:

one or more analog receivers connected to receive spread spectrum communication signals, each receiver configured to receive signals of at least one carrier frequency and convert said signals to digital communication signals, which are provided at outputs;

a plurality of demodulating means connected to the outputs of each of said analog receivers for despreading each of said digital communication signals using preselected pseudorandom noise (PN) type code sequences to produce encoded data symbols, and for transforming at least a preselected number of said encoded data symbols into energy metric signals indicative of energy values associated with encoded data symbols, said demodulating means configured to accommodate a number of signals equal to the product of a predetermined maximum number of subscribers to be serviced by a receiver and a maximum expected average number of signal paths over which communication signals are to be received from each subscriber through that corresponding analog receiver; and one or more metric data receivers, each connected to receive energy metric signals from one or more of said demodulating means associated with each analog receiver which are providing metric signals for a pre-assigned single encoded communication channel.

12. The apparatus of claim 11 wherein said demodulating means comprises demodulating modules, the number of modules being equal to the product of a predetermined maximum number of subscribers to be serviced by a receiver and a maximum expected average number of signal paths so that at least one module is available for each diversity communication path over which communication signals are to be received from each subscriber through that corresponding analog receiver, which each comprise:

despreading means for generating despread digital communication signals in the form of encoded data symbols; and transformation means for receiving said encoded data symbols and for performing orthogonal function transformations to generate symbol energy metrics for a channel operating through a corresponding analog receiver.

13. The apparatus of claim 12 further comprising summation means for summing symbol energy metrics received at inputs of each of said metric receivers from multiple demodulating means to generate a single channel symbol energy metric for deriving channel data.

14. The apparatus of claim 12 wherein said transformation means comprise Fast Hadamard Transformers.

15. The apparatus of claim 11 wherein each of said metric receivers is pre-assigned to a single encoded signal channel to be processed.

16. The apparatus of claim 11 wherein said analog receivers are configured to receive signals of at least one carrier frequency and convert said signals to digital communication signals at predetermined sampling rates.

17. The apparatus of claim 11 wherein said analog receivers are provided within a gateway type base station and at least one satellite based repeater is employed to transfer said communication signals from subscriber units within said communication system to said analog receivers.

18. The apparatus of claim 17 wherein there are at least two satellites in communication with said gateway at any given time.

19. The apparatus of claim 11 wherein said preselected pseudonoise (PN) sequences are also used to modulate in-phase and quadrature components of digital data signals prior to transmission to intended recipients.

20. The apparatus of claim 11 wherein said communication system comprises a wireless telephone/data communication system in which remote users are located within a plurality of cells and communicate information signals to at least one gateway, using code division multiple access (CDMA) spread spectrum type communication signals.

* * * * *